US006658008B1

(12) United States Patent
Hosein

(10) Patent No.: US 6,658,008 B1
(45) Date of Patent: Dec. 2, 2003

(54) METHOD AND APPARATUS FOR REMOVAL OF DATALESS FRAMES WHEN TRANSPORTING PRIVATE LINE TRAFFIC OVER AN ATM NETWORK

(75) Inventor: Patrick A. Hosein, Monmouth, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/268,671

(22) Filed: Mar. 16, 1999

Related U.S. Application Data

(60) Provisional application No. 60/114,459, filed on Dec. 30, 1998.

(51) Int. Cl.[7] .............................................. H04L 12/56
(52) U.S. Cl. .............................. 370/395.64; 370/395.6; 370/465; 370/532; 370/535
(58) Field of Search ................................. 370/352, 356, 370/357, 359, 395.1, 395.2, 395.6, 395.64, 421, 422, 442, 459, 465, 466, 468, 474, 498, 532, 535, 542, 229, 232, 419, 420, 463, 248, 394, 410, 471, 477

(56) References Cited

U.S. PATENT DOCUMENTS

| | | | | |
|---|---|---|---|---|
| 5,805,577 A | * | 9/1998 | Jain et al. ..................... | 370/234 |
| 5,946,323 A | * | 8/1999 | Eakins et al. ................. | 370/468 |
| 6,028,840 A | * | 2/2000 | Worster ........................ | 370/230 |
| 6,038,231 A | * | 3/2000 | Dolby et al. ................. | 370/394 |
| 6,108,336 A | * | 8/2000 | Duault et al. ............. | 370/395.6 |
| 6,169,735 B1 | * | 1/2001 | Allen, Jr. et al. ........... | 370/352 |
| 6,331,981 B1 | * | 12/2001 | Harth et al. .............. | 370/395.1 |
| 6,353,616 B1 | * | 3/2002 | Elwalid et al. ............. | 370/443 |

OTHER PUBLICATIONS

K. Sriram and T.-Y. Wang, "Voice Over ATM Using AAL2 and Bit Dropping: Performance and Call Admission Control," 1998 IEEE ATM Workshop (May 1998).

(List continued on next page.)

Primary Examiner—Douglas Olms
Assistant Examiner—Phirin Sam

(57) ABSTRACT

A method and apparatus are provided to remove dataless TDM frames when transporting private line traffic over an ATM network. A number of TDM frames comprising a TDM private line circuit are received, and it is determined if a TDM frame contains data. The determination may be based on, for example, the detection of one or more frame delimiters, such as by comparing information in the TDM frame with a pre-determined frame delimiter pattern. Information from the TDM frame is placed into an ATM cell only when the TDM frame contains data. An indication that a TDM frame has not been placed into an ATM cell is conveyed in the AAL2 headers. A first plurality of TDM private line circuits, such as T1 circuits, may be multiplexed into a first real time variable bit rate (rt-VBR) virtual circuit, and a second plurality of TDM private line circuits may be multiplexed into a second rt-VBR virtual circuit, such that the bandwidths of the first and second rt-VBR virtual circuits are not limited, such as by using AAL2 multiplexing with substantially large SCR, PCR and MBS values. The first and second rtVBR virtual circuits may then be combined for transport over the ATM network link, and an indication that a TDM frame without data has not been transported is used to re-insert the dataless TDM frame.

3 Claims, 2 Drawing Sheets

OTHER PUBLICATIONS

Kotikalapudi Sriram, R. Scott McKinney and Mostafa Hashem Serif, "Voice Packetization and Compression in Broadband ATM Networks," IEEE Journal of Selected Areas in Communications, vol. 9, No. 3, pp. 294304 (Apr. 1991).

J.L. Marzo, J. Domingo–Pascual, R. Fabregat and J. Solé–Pareta, "Enhanced Convolution Approach for Connection Admission Control in ATM Networks," pp. 165–181.

Silvia Giordano, Jean–Yves Le Boudec, Philippe Oechslin and Stephan Robert, "VBR Over VBR: The Homogeneous, Loss–Free Case,".

John H. Baldwin, Behram H. Bharucha, Bharat T. Doshi, Subrahmanyam Dravida and Sanjiv Nanda, "AAL–2—A New ATM Adaptation Layer for Small Packet Encapsulation and Multiplexing," Bell Labs Technical Journal, pp. 111–131 (Spring 1997).

* cited by examiner

METHOD AND APPARATUS FOR REMOVAL OF DATALESS FRAMES WHEN TRANSPORTING PRIVATE LINE TRAFFIC OVER AN ATM NETWORK

CROSS REFERENCE TO RELATED APPLICATIONS

This application claims the benefit of U.S. Provisional Application No. 60/114,459 entitled "Method and Apparatus for Removal of Dataless Frames When Transporting Private Line Traffic Over an ATM Network", filed Dec. 30, 1998.

The present invention is related to U.S. Provisional Patent Application No. 60/114,378 entitled "Method and Apparatus for Transporting TDM Voice Traffic Over an ATM Network" to Patrick A. Hosein and Gagan L. Choudhury; U.S. Provisional Patent Application No. 60/114,394 entitled "Method and Apparatus for Transporting Private Line Traffic Over an ATM Network" to Patrick A. Hosein and Gagan L. Choudhury; and U.S. Provisional Patent Application No. 60/114,458 entitled "Method and Apparatus for Overload and Admission Controls Using the AAL2 Adaptation Layer for TDM Voice and Private Line Traffic" to Patrick A. Hosein, all filed concurrently herewith and the entire disclosures of which are hereby incorporated by reference.

FIELD OF THE INVENTION

The present invention relates to communication networks. More particularly, the present invention relates to a method and apparatus for the removal of dataless TDM frames when transporting private line traffic over an ATM network.

BACKGROUND OF THE INVENTION

Within a telecommunication network, "private line" circuits (TDM lines) may be used to transport information, including voice and/or data traffic. A private line connection between two points may be used, for example, by a business to connect Local Area Networks (LANs) in geographically distant offices. The private line connection is reserved, and therefore the network provider can assure a high Quality of Service (QOS) in terms of bandwidth and delay. Although private line traffic may not need such a high QOS, existing customer agreements and equipment often require them. A T1 circuit is one example of a private line circuit and provides a maximum transmission speed of 1.544 megabits per second (Mb/s).

In order to provide this QOS, private line traffic is traditionally transported using a Synchronous Transfer Mode (STM) network. A network using Time Division Multiplexing (TDM) is one example of an STM network. Using TDM, each channel of private line traffic is assigned a specific time period, or TDM channel, configured to let the channel carry a desired maximum amount of data information. In this way, the STM network provides a high QOS because each TDM channel, by design, can handle the maximum amount of data information. As a result, data information is generally not lost or delayed. If, however, less than the maximum amount of data information is being sent over a TDM channel, a number of the channel's assigned time periods are not used, and bandwidth is therefore wasted when no data is being transmitted.

It is also known that private line traffic can be transported via an Asynchronous Transfer Mode (ATM) network. An ATM network uses dedicated-connection switching technology that organizes digital data into 53-byte cells and transmits them over a medium using digital signal technology. Individually, a cell is processed asynchronously relative to other related cells and may be queued before being multiplexed with other cells, from other channels, over a single line, or "link." Because ATM networks are more easily implemented by hardware (rather than software), faster processing speeds are possible. In addition, ATM networks allow for more efficient bandwidth use because different services, such as voice and data, can be statistically multiplexed over the same link.

An AAL adaptation layer packages higher layer information, such as the T1 or E1 circuit information, into the contents of the 53-byte ATM cell. A number of these virtual circuits are then combined for transport over an ATM network link, such as over a single ATM network "pipe."

To maintain the high quality traditionally associated with STM networks, the AAL 1 adaptation layer is used together with Constant Bit Rate (CBR) service (together known as "circuit emulation"). As with TDM, the CBR circuit emulation approach provides a constant guaranteed rate of transfer. That is, a CBR connection allocates enough bandwidth to each channel to support a desired maximum rate. In this way, CBR circuit emulation provides a QOS similar to that of a STM network, but does not provide any statistical multiplexing benefits since cells are still used even when no information is being transported. In other words, with circuit emulation the excess bandwidth that is not used by a customer is not available in the ATM network for other services. This may be a significant amount of unused bandwidth, especially during non-business hours.

U.S. Provisional Patent Application No. 60/114,394 entitled "Method and Apparatus for Transporting Private Line Traffic Over an ATM Network" discloses a system for transporting private line traffic over an ATM network using, for example, AAL2 multiplexing. To achieve a reduction in bandwidth using this technique, however, TDM frames without data must not be converted into ATM cells and relayed over the ATM pipe.

In view of the foregoing, it can be appreciated that a substantial need exists for a method and apparatus to remove frames without data when transporting private line traffic over an ATM network that allows for statistical multiplexing benefits while providing high quality private line traffic and solving the other problems discussed above.

SUMMARY OF THE INVENTION

The disadvantages of the art are alleviated to a great extent by a method and apparatus for removing frames without data when transporting private line traffic over an ATM network. A number of TDM frames comprising a TDM private line circuit are received, and it is determined if a TDM frame contains data. The determination may be based on, for example, the detection of one or more frame delimiters, such as by comparing information in the TDM frame with a predetermined frame delimiter pattern. Information from the TDM frame is placed into an ATM cell only when the TDM frame contains data. The AAL2 adaptation layer can be used to indicate when TDM frames have been removed. The removed frames are then re-inserted at the ATM to TDM interface. A first plurality of TDM private line circuits, such as T1 circuits, may be multiplexed into a first real time variable bit rate (rt-VBR) virtual circuit, and a second plurality of TDM private line circuits may be multiplexed into a second rt-VBR virtual circuit, such that the bandwidths of the first and second rt-VBR virtual circuits are not limited, such as by using AAL2 multiplexing with substantially large SCR, PCR and MBS values. The first and second rt-VBR virtual circuits may then be combined for transport over the ATM network link, and an indication that a TDM frame without data has been removed is used to re-insert the dataless TDM frame.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
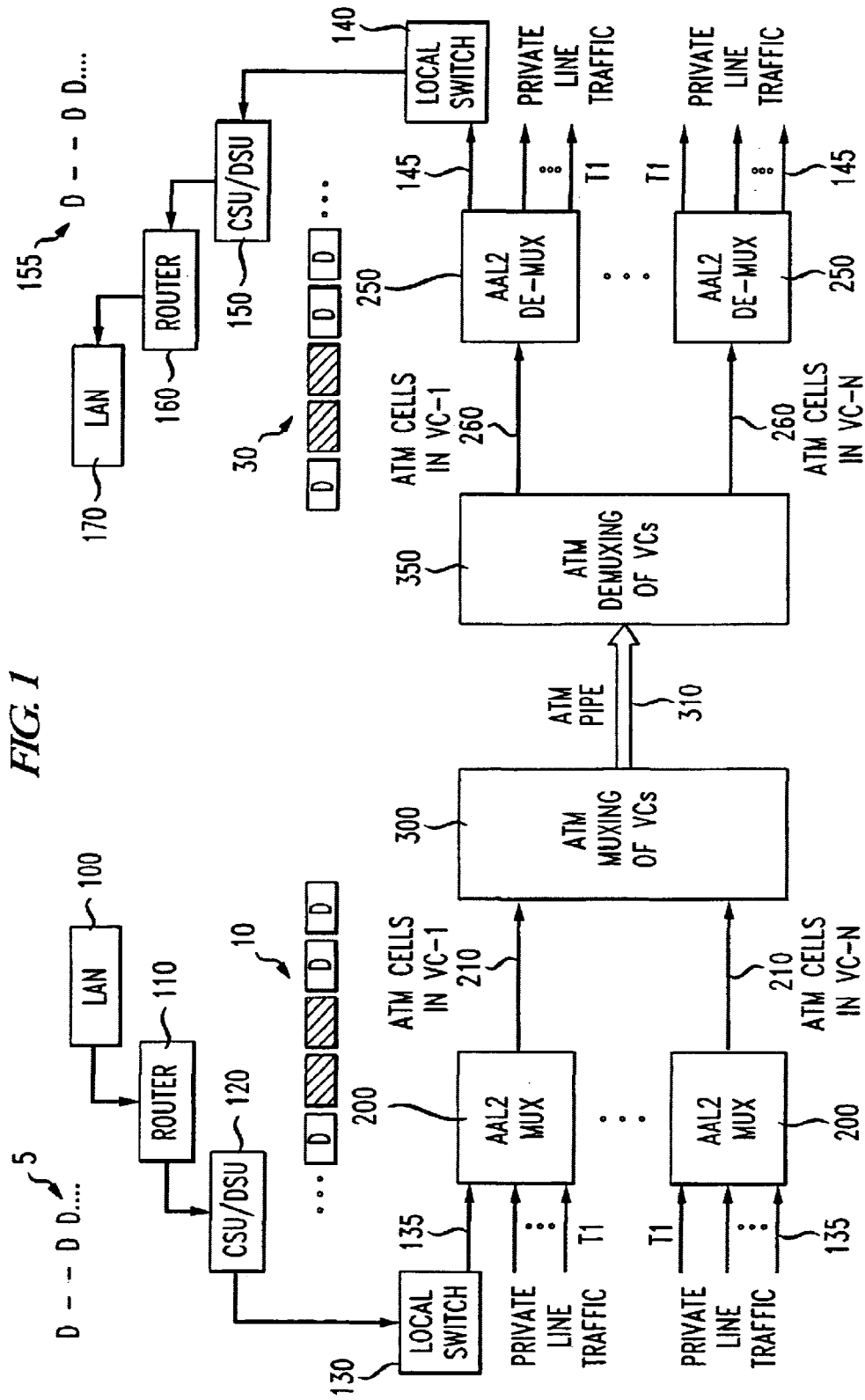
FIG. 1 is a block diagram of a network that removes TDM frames without data according to an embodiment of the present invention.

The present invention is directed to a method and apparatus for removing TDM frames without data. Referring now in detail to the drawings wherein like parts are designated by like reference numerals throughout, there is illustrated in FIG. 1 a block diagram of a network that transports private line traffic over an ATM pipe 310, such as a link in an ATM backbone, according to an embodiment of the present invention.

Information from a private line customer, such as asynchronous information 5 from a first LAN 100, is sent to a Channel Service Unit/Data Service Unit (CSU/DSU) 120 through a router 110. The asynchronous LAN traffic is converted into a synchronous bit stream that is forwarded to the CSU/DSU 120 using, for example, the V.35 or RS-449 protocol. For example, the router 110 may use a High-level Data Link Control (HDLC) protocol—or a subset such as the Synchronous Data Link Control (SDLC) or even Frame Relay service—to frame asynchronous LAN traffic before sending the information to the CSU/DSU 120. The HDLC protocol delimits frames with a pre-determined flag ("01111110"). This flag is also transmitted when there is no data to be sent. Note that TDM voice traffic, such as TDM voice traffic from a Private Branch Exchange (PBX) not shown in FIG. 1, may also be multiplexed with the LAN 100 data before HDLC encapsulation.

The CSU/DSU 120 forwards this information to a local TDM switch 130. The CSU/DSU 120 takes the synchronous stream from the router 110 and packs it into the data fields of a TDM frame. By way of example it may be assumed that a customer leases an unchannelized T1 leased line, but it will be understood that the present invention may also be used, for example, with DS0, E1 or T3 lines. In the case of a T1 line, every 125 microseconds ($\mu$sec) the CSU/DSU 120 receives 192 bits from the router 110 which are inserted into a T1 frame.

If there is no data transmission during a 125 $\mu$sec period, the router 110 simply sends the bit stream 24×"01111110" to the CSU/DSU 120, which places the patterns into the next T1 frame. Thus, as shown in FIG. 1, the information from the CSU/DSU 120 may contain a number of TDM frames 10, including frames with data (shown with a D) and frames completely without data (shown cross-hatched), to be transported. Note that some frames, in practice, will contain a combination of data octets and delimiter octets, such as when frames start or end within a T1 frame period. According to an embodiment of the present invention, only frames that completely contain delimiter octets should be "suppressed" as described below.

Information from the local switch 130, in the form of a private line data circuit 135, may then be sent to an AAL2 multiplexing unit 200 where a TDM to ATM conversion is performed, such as at an ATM switch operated by a network provider or other "processing device." A number of these private line traffic data circuits 135, such as a number of T1 circuits, are combined at the AAL2 adaptation layer unit 200 to create a virtual circuit 210. The bandwidth of each rt-VBR virtual circuit 210 may be "unlimited." In other words, SCR, PCR and MBS values for each rt-VBR virtual circuit 210 can be selected such that each virtual circuit 210 can use any bandwidth available at the ATM network pipe 310.

As shown in FIG. 1, a number of rt-VBR virtual circuits 210, such as VC-1 to VC-N, may be required for a high speed ATM pipe 310 because the AAL2 standard allows for a maximum of 248 traffic sources per virtual circuit. Assuming no buffers, a maximum number of private line circuits can then be computed to provide the desired Cell Loss Ratio (CLR). Since the characteristics of the load may change over time, the system may be monitored, in real time, to ensure that the desired CLR is achieved.

According to an embodiment of the present invention, dataless frames are not included in the cells transported over the ATM pipe 310, leaving only cells that contain data, as follows. At the AAL2 multiplexing unit 200, such as an ATM switch that performs the TDM to ATM conversion, 192 bits of a T1 frame (F) are extracted every 120 $\mu$sec. A modulo-2 bitwise sum of F and 24×"01111110" is then performed. If this operation results in all zeros, then the AAL2 multiplexing unit 200 has determined that the frame contains only delimiters, and the frame is not included in the cells relayed over the ATM pipe 310. If the bitwise sum is not all zeros, then F is AAL2 multiplexed in ATM cells and relayed over the ATM pipe 310. Note that the determination of whether or not a frame contains data, such as the bitwise sum described above, may be performed entirely by hardware, if desired. Note that this is only one technique that can be used to remove frames without data, and other techniques will be apparent to those skilled in the art.

At the other end of the ATM pipe 310, an AAL2 de-multiplexing unit 250 or second ATM switch that performs an ATM to TDM conversion, it is determined if a frame was "dropped" in this way by examining AAL2 header information. Any dropped frames, i.e. frames that had no data, are re-inserted.

The ATM de-multiplexing unit 350 also separates the single stream received through the ATM pipe 310 and re-creates the N rt-VBR virtual circuits 260. Each of these rt-VBR virtual circuits 260 may then pass through an AAL2 de-multiplexing unit 250 to re-create the T1 circuits 145 including dataless TDM frames 30. The information in the T1 circuits 140 passes through a second local switch 140, a second CSU/DSU 140 and a router 160 before reaching, for example, a second LAN 170 (or PBX) operated by the private line customer where the asynchronous data 155 may be used.

Figure 2:
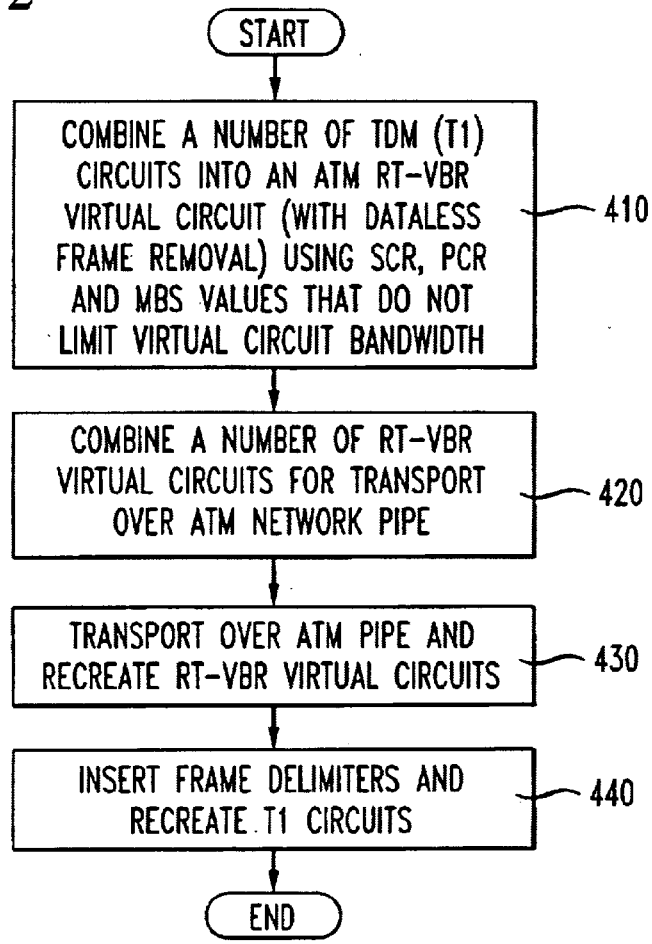
FIG. 2 is a flow diagram of a method for removing TDM frames without data according to an embodiment of the present invention.

FIG. 2 is a flow diagram of a method for transporting private line traffic over an ATM network according to an embodiment of the present invention. At step 410, frame delimiters are removed from an original information stream and a number of TDM T1 circuits are combined to create a rt-VBR virtual circuit using SCR, PCR and MBS values that do not restrict the bandwidth of the rt-VBR virtual circuit, such as substantially large SCR, PCR and MBS values. This may be done, as described with respect to FIG. 1, by performing a modulo-2 bitwise sum of F and 24×"01111110."

A number of these rt-VBR virtual circuits are combined at an ATM multiplexing unit for transport over an ATM network pipe at step 420. At steps 430 and 440, the information is transported over the ATM pipe and the reverse of steps 410 and 420 are performed. That is, the rt-VBR virtual circuits are re-created and used to re-create the T1 circuits, including re-inserted frames without data.

Because several of these "unlimited" bandwidth rt-VBR virtual circuits are multiplexed onto the ATM pipe, statistical multiplexing is achieved at the link level as well as at the AAL2 level. In addition, ATM cells will be rarely queued or dropped, resulting in data quality similar to that obtained using an STM network or circuit emulation. According to an embodiment of the present invention, real time data compression may also be implemented at the AAL2 multiplexing unit.

Moreover, because ATM cells are not queued, the rt-VBR virtual circuit buffers will not overflow. Thus, there is no need to invoke overload control based on individual rt-VBR virtual circuits, simplifying congestion management for the system. In other words, each rt-VBR virtual circuit does not need to be policed to ensure that traffic does not exceed the allocated SCR, PCR and MBS values (which can be set to very large values).

Figure 3:
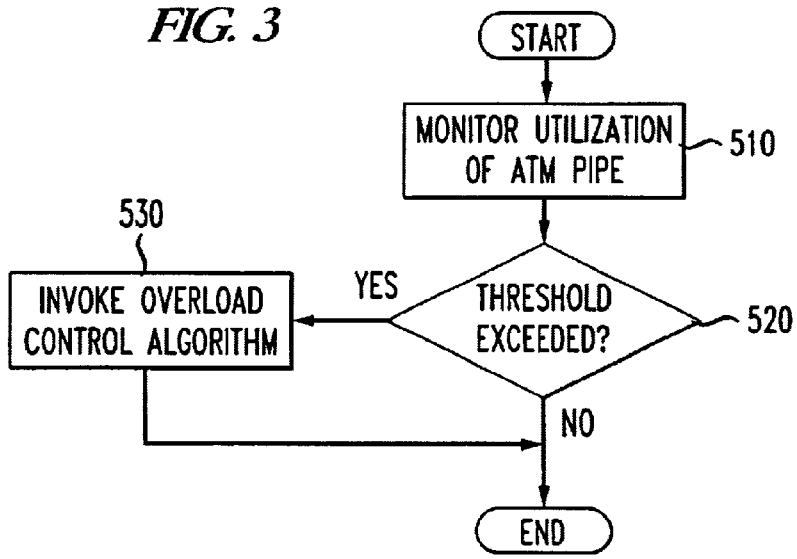
FIG. 3 is a flow diagram of a method for providing overload and admission controls when transporting private line traffic over an ATM network according to an embodiment of the present invention.

FIG. 3 is a flow diagram of a method for providing overload control when transporting private line traffic over an ATM network according to an embodiment of the present invention. Details of a suitable method are also disclosed in U.S. Provisional Patent Application No. 60/114,458 entitled "Method and Apparatus for Overload and Admission Controls Using the AAL2 Adaptation Layer for TDM Voice and Private Line Traffic".

Since no overload control is applied at the rt-VBR circuit level, there will be times when the ATM pipe capacity is not sufficient to serve the offered load, and overload control will be needed. This control can be applied to all rt-VBR virtual circuits, at all AAL2 multiplexing units, as follows. At step 510, the level of traffic, or "utilization", of the ATM pipe is monitored. When a utilization threshold value is exceeded at 520, an overload control algorithm is invoked at 530.

There can be significant advantages to invoking overload control on an ATM pipe basis as opposed to an rt-VBR virtual circuit basis. When done on a virtual circuit basis, the overload control is invoked whenever the load on a single virtual circuit bursts. In contrast, when done on an ATM pipe basis it is only invoked when the overall load exceeds a threshold value. In addition, a burst caused by a single virtual circuit is easily accommodated by using unused bandwidth from other virtual circuits. Another advantage is the fact that, because overload control is invoked at all virtual circuits simultaneously, a quick relief from the overload is possible. The overall link utilization information can also be used to determine if the link needs to be re-engineered, such as by adding or deleting circuits.

Although various embodiments are specifically illustrated and described herein, it will be appreciated that modifications and variations of the present invention are covered by the above teachings and within the purview of the appended claims without departing from the spirit and intended scope of the invention. For example, although particular system architectures were used to illustrate the present invention, it can be appreciated that other architectures may be used instead. Similarly, although particular types of protocols, links and channels have been illustrated, the present invention is not limited by these illustrations. Finally, although software or hardware are described to control certain functions, such functions can be performed using either software, hardware or a combination of software and hardware, as is well known in the art. As is also known, software may be stored on a medium, such as, for example, a hard or floppy disk or a Compact Disk Read Only Memory (CD-ROM), in the form of instructions adapted to be executed by a processor. The instructions may be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

What is claimed is:

1. A method for transporting private line traffic, comprising the steps of:

receiving a number of Time Division Multiplexing (TDM) frames comprising a TDM private line circuit, wherein the TDM private line circuit comprises one of a first plurality of TDM circuits;

determining if a TDM frame contains data;

placing information from the TDM frame into an Asynchronous Transfer Mode (ATM) cell only when the TDM frame contains data;

generating an indication when information in the TDM frame is not placed in an ATM cell, the indication comprising AAL2 header information;

multiplexing the first plurality of TDM private line circuits into a first real time variable bit rate (rt-VBR) virtual circuit such that the bandwidth of the first rt-VBR virtual circuit is not limited;

multiplexing a second plurality of TDM private line circuits into a second rt-VBR virtual circuit such that the bandwidth of the second rt-VBR virtual circuit is not limited; and combining the first and second rt-VBR virtual circuits for transport over the ATM network link, wherein said steps of multiplexing use sustainable cell rate, peak cell rate and maximum burst size values that enable said first and second virtual circuits to use any bandwidth available at said network link.

2. The method of claim 1, comprising the further step of invoking an overload control algorithm when an ATM network link utilization exceeds a threshold value.

3. An apparatus, comprising:

an input channel configured to receive a number of Time Division Multiplexing (TDM) frames comprising a TDM private line circuit, wherein the TDM private line circuit comprises one of a first plurality of TDM circuits;

a processing device coupled to said input channel and configured to determine if a TDM frame contains data, and to place information from the TDM frame into an Asynchronous Transfer Mode (ATM) cell only when the TDM frame contains data, wherein said processing device is further configured to:

multiplex the first plurality of TDM private line circuits into a first real time variable bit rate (rt-VBR) virtual circuit such that the bandwidth of the first rt-VBR virtual circuit is not limited;

multiplex a second plurality of TDM private line circuits into a second rt-VBR virtual circuit such that the bandwidth of the second rt-VBR virtual circuit is not limited; and combine the first and second rt-VBR virtual circuits for transport over the ATM network link, wherein the multiplexing performed by said processing device uses ATM Adaptation Layer type 2 (AAL2) multiplexing; and an output channel coupled to said processing device and configured to transmit the ATM cell over an ATM network link, wherein the multiplexing uses substantially large sustainable cell rate, peak cell rate and maximum burst size values.

* * * * *